US012571295B2

(12) United States Patent
Sodagar et al.

(10) Patent No.: US 12,571,295 B2
(45) Date of Patent: Mar. 10, 2026

(54) SYSTEM AND METHOD FOR FREQUENCY RATIO VOLUME FLUID GEOBODY EXTRACTION

(71) Applicant: SAUDI ARABIAN OIL COMPANY, Dhahran (SA)

(72) Inventors: Taher M. Sodagar, Dhahran (SA); Amin Z. Alali, Dhahran (SA); Ahmed M. Otaibi, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 464 days.

(21) Appl. No.: 18/182,958

(22) Filed: Mar. 13, 2023

(65) Prior Publication Data

US 2024/0309744 A1    Sep. 19, 2024

(51) Int. Cl.
    *E21B 44/00*        (2006.01)
    *G01V 1/28*         (2006.01)
    (Continued)

(52) U.S. Cl.
    CPC .............. *E21B 44/00* (2013.01); *G01V 1/282* (2013.01); *G01V 1/302* (2013.01); *G01V 1/345* (2013.01);
    (Continued)

(58) Field of Classification Search
    CPC ..... E21B 44/00; E21B 2200/20; G01V 1/282; G01V 1/302; G01V 1/345;
    (Continued)

(56) References Cited

U.S. PATENT DOCUMENTS 6,131,071 A * 10/2000 Partyka ..................... G01V 1/32
                                                    702/16
6,941,227 B2 9/2005 Goloshubin et al.
                    (Continued)

FOREIGN PATENT DOCUMENTS

CN      105954801 A      9/2016
EP      2 577 356 B1     9/2020

OTHER PUBLICATIONS

Chen, Ganglin et al., "Spectral-decomposition response to reservoir fluids from a deepwater West Africa reservoir"; Geophysics; vol. 73, Issue 6; pp. C23-C30; Nov.-Dec. 2008 (8 pages).
                    (Continued)

*Primary Examiner* — Mi'schita' Henson
(74) *Attorney, Agent, or Firm* — Osha Bergman Watanabe & Burton LLP

(57)            ABSTRACT

Examples of methods and systems are disclosed. The methods include, obtaining a seismic dataset regarding a subsurface region of interest, wherein the seismic dataset comprises a plurality of time-domain seismic traces. The methods also include determining a plurality of single-frequency volumes from the plurality of time-domain seismic traces. The methods further include determining a frequency ratio volume based, at least in part, on the plurality of single-frequency volumes. The methods still further include extracting a three-dimensional (3D) geological body based, at least in part, on the frequency ratio volume. The methods further include determining a drilling target in the subsurface region based on the 3D geological body.

16 Claims, 8 Drawing Sheets

(51) Int. Cl.
_G01V 1/30_ (2006.01)
_G01V 1/34_ (2006.01)

(52) U.S. Cl.
CPC .... *E21B 2200/20* (2020.05); *G01V 2210/512*
(2013.01)

(58) Field of Classification Search
CPC ............. G01V 2210/512; G01V 1/325; G01V
2210/43; G01V 2210/63; G01V
2210/641; G01V 1/307
See application file for complete search history.

(56) References Cited

U.S. PATENT DOCUMENTS

| | | | |
|---|---|---|---|
| 7,463,552 | B1 | 12/2008 | Padgett |
| 8,213,261 | B2 * | 7/2012 | Imhof ...................... G01V 1/32 |
| | | | 702/14 |
| 11,333,780 | B2 | 5/2022 | Sodagar et al. |
| 11,592,589 | B2 | 2/2023 | Sodagar et al. |
| 11,821,307 | B2 | 11/2023 | Alali et al. |
| 12,153,180 | B2 | 11/2024 | Sodagar et al. |
| 2020/0173273 | A1 * | 6/2020 | Thiruvenkatanathan .................... |
| | | | G01V 1/288 |
| 2020/0348432 | A1 | 11/2020 | Sodagar |
| 2022/0107435 | A1 | 4/2022 | AlDubaisi et al. |

OTHER PUBLICATIONS

Sodagar, Taher M. et al., "Revelation of the Triassic Gas Potential with Insight of Iso Frequency Spectral Decomposition in Saudi Arabia's Offshore"; Proceedings of the SPE Middle East Oil & Gas Show and Conference; Paper No. SPE-172625-MS; pp. 1-16; Mar. 8, 2015 (16 pages).

Nawaz, Muhammad Atif et al., "Variational Bayesian Inversion of Seismic Attributes Jointly for Geologic Facies and Petrophysical Rock Properties"; Geophysics; vol. 85, Issue 4; pp. MR213-MR233; Jul.-Aug. 2020 (47 pages).

Wang, Yanghua, "Seismic time-frequency spectral decomposition by matching pursuit"; Geophysics; vol. 72, Issue 1; pp. V13-V20; Jan.-Feb. 2007 (8 pages).

Othman, Adel A.A. et al., "Use of spectral decomposition technique for delineation of channels at Solar gas discovery, offshore West Nile Delta, Egypt"; Egyptian Journal of Petroleum; vol. 25, Issue 1; pp. 45-51; Mar. 2016 (7 pages).

Alwusaibie, Abdullah et al., "Detecting Porous Gas Accumulations through Seismic Amplitude Analysis in Paleo-Zoic Siliciclastic Reservoir, Saudi Arabia"; Proceedings of the International Petroleum Technology Conference; Paper No. IPTC-19872-Abstract; pp. 1-7; Jan. 13, 2020 (7 pages).

Riedel, Michael et al., "Seismic facies analyses as aid in regional gas hydrate assessments. Part-I: Classification analyses"; Marine and Petroleum Geology; vol. 47; pp. 248-268; Nov. 2013 (21 pages).

L. Wang et al., "Hydrocarbon detection using adaptively selected spectrum attenuation", Journal of Applied Geophysics, Jun. 2014, vol. 105, pp. 59-66 (8 pages).

International Search Report and Written Opinion issued in corresponding International Application No. PCT/US2024/019436, dated Jun. 24, 2024 (35 pages).

\* cited by examiner

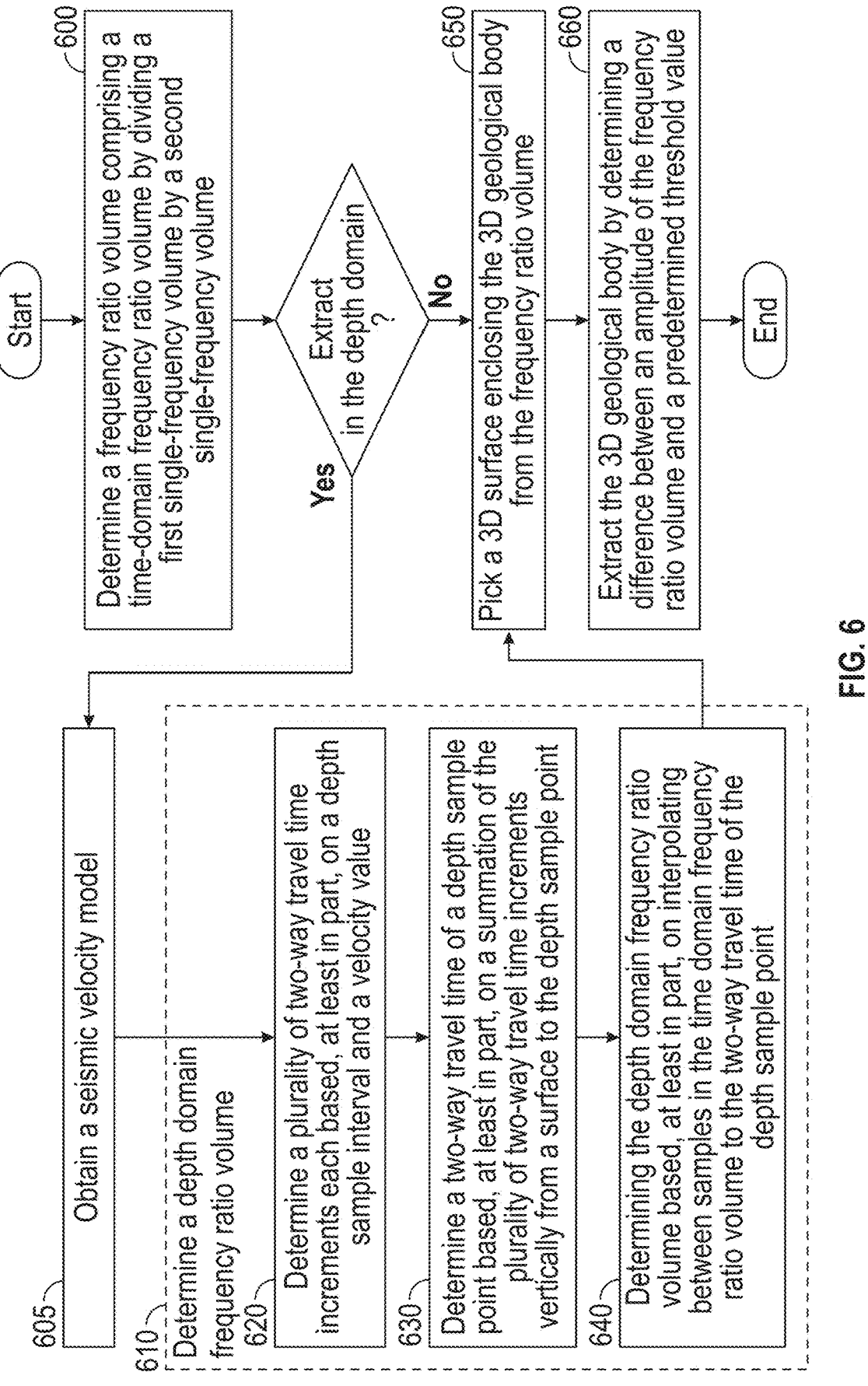

Start

Determine a frequency ratio volume comprising a time-domain frequency ratio volume by dividing a first single-frequency volume by a second single-frequency volume — 600

Extract in the depth domain ? — Yes / No

Obtain a seismic velocity model — 605

Determine a depth domain frequency ratio volume — 610

Determine a plurality of two-way travel time increments each based, at least in part, on a depth sample interval and a velocity value — 620

Determine a two-way travel time of a depth sample point based, at least in part, on a summation of the plurality of two-way travel time increments vertically from a surface to the depth sample point — 630

Determining the depth domain frequency ratio volume based, at least in part, on interpolating between samples in the time domain frequency ratio volume to the two-way travel time of the depth sample point — 640

Pick a 3D surface enclosing the 3D geological body from the frequency ratio volume — 650

Extract the 3D geological body by determining a difference between an amplitude of the frequency ratio volume and a predetermined threshold value — 660

End

FIG. 6

SYSTEM AND METHOD FOR FREQUENCY RATIO VOLUME FLUID GEOBODY EXTRACTION

BACKGROUND

In the oil and gas industry it is often valuable to identify subsurface regions with specific characteristics such as gas/fluid content based on acquired seismic data. Acquired seismic data may include a wide range of frequencies. Spectral decomposition may be applied to seismic data to obtain data volumes corresponding to discrete frequency values.

The presence of gas in the pores of a geological formation are known to affect the attenuation of seismic waves. Attenuation is known to affect the amplitude of high frequency seismic waves more than the amplitude of low frequency seismic waves. Thus, the detection and characterization of hydrocarbon reservoirs may be improved by using the frequency volumes as a seismic attribute.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, embodiments disclosed herein relate to a method including obtaining a seismic dataset regarding a subsurface region of interest, where the seismic dataset includes a plurality of time-domain seismic traces. The method also includes determining a plurality of single-frequency volumes from the plurality of time-domain seismic traces. The method further includes determining a frequency ratio volume based, at least in part, on the plurality of single-frequency volumes and extracting a three-dimensional (3D) geological body based, at least in part, on the frequency ratio volume. The method includes determining a drilling target in the subsurface region based on the 3D geological body.

In general, in one aspect, embodiments disclosed herein relate to a system including a seismic acquisition system and a seismic processor. The seismic acquisition system is configured to record a seismic dataset regarding a subsurface region of interest, wherein the seismic dataset includes a plurality of time-domain seismic traces. The seismic processor is configured to obtain the plurality of time-domain seismic traces. The seismic processor is also configured to determine a plurality of single-frequency volumes from the plurality of time-domain seismic traces. The seismic processor is further configured to determine a frequency ratio volume based, at least in part, on the plurality of single-frequency volumes. The seismic processor is still further configured to extract a three-dimensional (3D) geological body based, at least in part, on the frequency ratio volume. The seismic processor is further configured to determine a drilling target in the subsurface region based on the 3D geological body.

Other aspects and advantages of the claimed subject matter will be apparent from the following description and the appended claims.

BRIEF DESCRIPTION OF DRAWINGS

FIG. 6 shows a flowchart in accordance with one or more embodiments.

DETAILED DESCRIPTION

Figure 1:
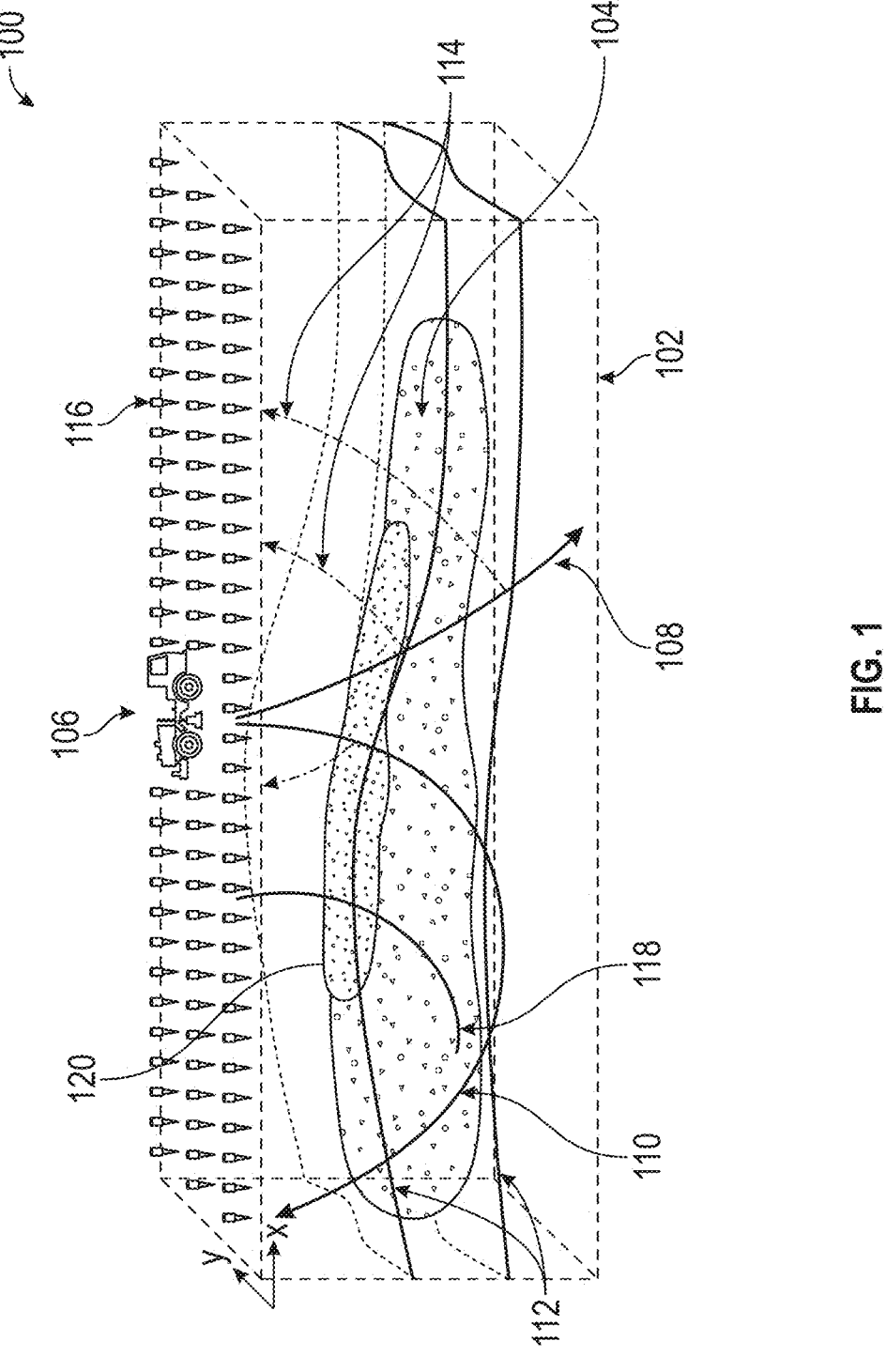
FIG. 1 illustrates a seismic acquisition system of a subsurface region of interest, in accordance with one or more embodiments.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In the following description of FIGS. 1-9, any component described regarding a figure, in various embodiments disclosed herein, may be equivalent to one or more like-named components described with regard to any other figure. For brevity, descriptions of these components will not be repeated regarding each figure. Thus, each and every embodiment of the components of each figure is incorporated by reference and assumed to be optionally present within every other figure having one or more like-named components. Additionally, in accordance with various embodiments disclosed herein, any description of the components of a figure is to be interpreted as an optional embodiment which may be implemented in addition to, in conjunction with, or in place of the embodiments described with regard to a corresponding like-named component in any other figure.

It is to be understood that the singular forms "a," "an," and "the" include plural referents unless the context clearly dictates otherwise. Thus, for example, reference to "a seismic signal" includes reference to one or more of such seismic signals.

Terms such as "approximately," "substantially," etc., mean that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is to be understood that one or more of the steps shown in the flowcharts may be omitted, repeated, and/or performed in a different order than the order shown. Accordingly, the scope disclosed herein should not be considered limited to the specific arrangement of steps shown in the flowcharts.

In general, disclosed embodiments include systems and methods to extract a three-dimensional geological body from volumes of seismic attributes obtained from processing seismic data acquired by a seismic acquisition system. In some cases, it may be desirable to drill a wellbore into a hydrocarbon deposit to produce the hydrocarbon to the surface. Such a wellbore may be a vertical wellbore or may be a horizontal wellbore constructed using geosteering methods. Description of the hydrocarbon deposit in three-dimensions may assist in locating potential drilling targets or in identifying the lateral extent of a hydrocarbon reservoir.

Fluid and lithology geological facies of subsurface volumes of rocks may be classified with the use of seismic attributes such as P and S wave impedances. In some situations, seismic attributes may be used to identify a gas bearing portion of a reservoir within a subsurface region of interest. Portions of the reservoir containing a gas deposit may affect the characteristics of propagating seismic waves differently from portions of the reservoir containing oil or water. Seismic waves traversing a reservoir containing gas may be strongly attenuated, particularly the high-frequency components. However, in some situations, because of variations of the reservoir thickness and impedances, the sole amplitudes of the high-frequency components of the seismic waves may not be a reliable indicator of the presence of gas. Therefore, a more reliable indicator of the presence of hydrocarbons such as gas, is desired.

FIG. 1 shows a seismic acquisition system (100) of a subsurface region of interest (102), according to one or more embodiments. The subsurface region of interest (102) may contain a gas deposit (120) that may form part of a hydrocarbon reservoir (104). The gas may be methane, ethane, or another hydrocarbon gas. The seismic acquisition system (100) may utilize a seismic source (106) that generates radiated seismic waves (108). The radiated seismic waves (108) may return to the surface as refracted seismic waves (110) or reflected seismic waves (114). Reflected seismic waves (114) occur due to geological discontinuities (112). At the surface, refracted seismic waves (110) and reflected seismic waves (114) may be detected by seismic receivers (116).

In some embodiments, the refracted seismic waves (110) and reflected seismic waves (114) generated by a single activation of the seismic source (106) are recorded by a seismic receiver (116) as a time-series representing the amplitude of ground-motion at a sequence of discrete times. This time-series may be denoted a time-domain seismic "trace". A seismic source (106) may be positioned at a location denoted $(x_s, y_s)$ where x and y represent orthogonal axes on the earth's surface above the subsurface region of interest (102). The seismic receivers (116) are positioned at a plurality of seismic receiver locations denoted $(x_r, y_r)$. Thus, the refracted seismic waves (110) and reflected seismic waves (114) generated by a single activation of the seismic source (106) may be represented in the axes $(x_s, y_s, X_r, y_r, t)$ where t delimits the time sample at which the amplitude of ground-motion was measured by a seismic receiver (116).

Figure 2:
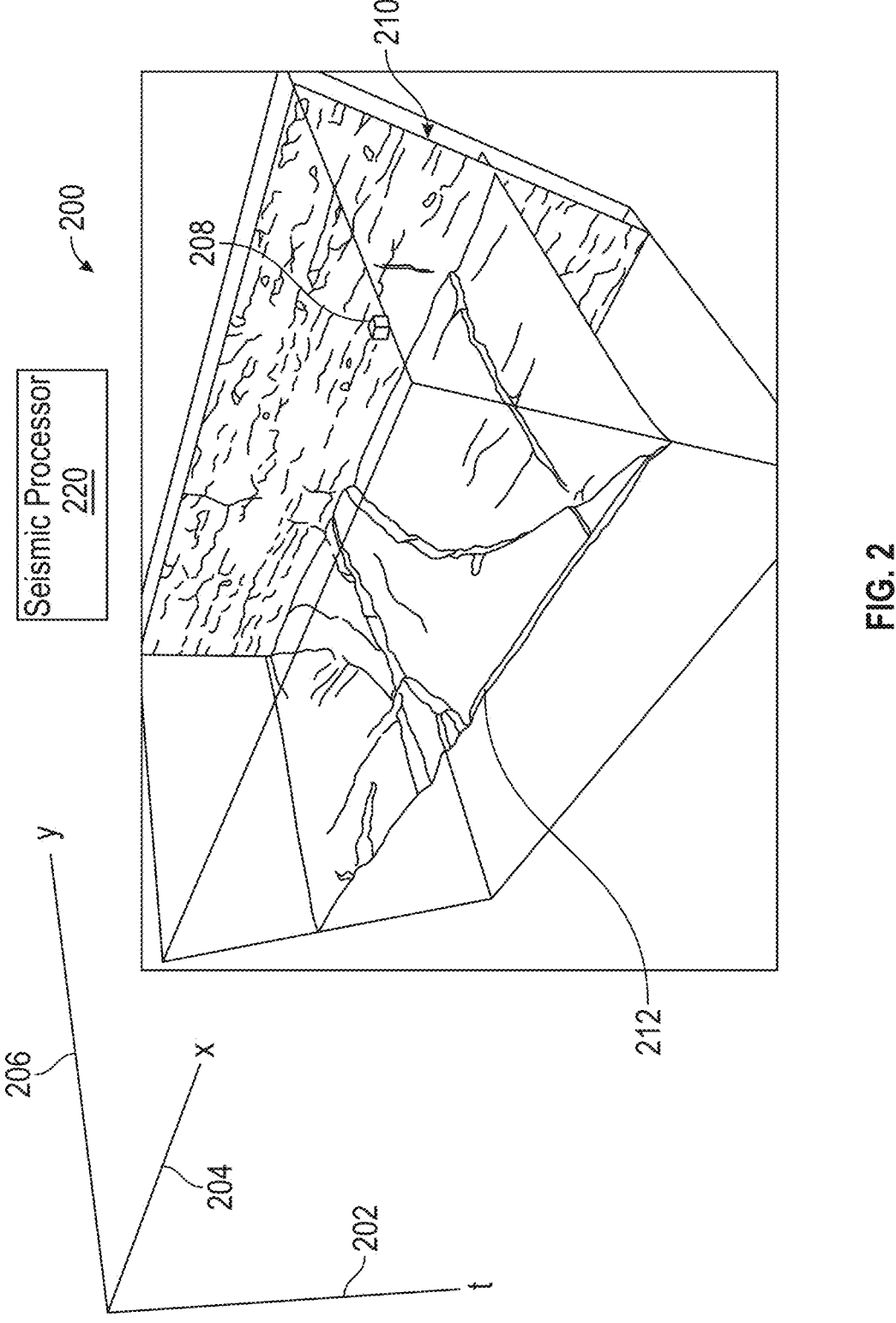
FIG. 2 shows an example of a volume of time-domain seismic traces in accordance with one or more embodiments.

FIG. 2 shows a volume of time-domain seismic traces in accordance with one or more embodiments. Seismic data produced by a seismic acquisition system (100) may be represented as a plurality of time-domain seismic traces (200) with one time axis (202), a first spatial dimension (204), and a second spatial dimension (206), where the first spatial dimension (204) and second spatial dimension (206) are orthogonal and span the Earth's surface above the subsurface region of interest (102). A seismic processor (220) may generate the plurality of time-domain seismic traces (200) by correcting the recorded time of seismic waves for the time of travel from the seismic source (106) to the seismic receiver (116). The seismic processor (220) may further sum (or "stack") the corrected time-domain seismic traces over two horizontal space dimensions.

FIG. 2 depicts 2D slices through the plurality or "the volume" of time-domain seismic traces (200). A three-dimensional (3D) pixel or voxel (208) of the volume of time-domain seismic traces (200) may represent an estimated attribute of the subsurface region of interest (102) at the position of the voxel. For example, the attribute may be, without limitation, a seismic wave reflection amplitude or a coherence value. FIG. 2 shows a vertical slice (210) and a horizontal slice (212) through the volume of time-domain seismic traces (200).

Processing data produced by a seismic acquisition system (100) to obtain the plurality of time-domain seismic traces (200) requires each step in the processing chain to be performed in a manner which does not distort the amplitude of the seismic signals. Non limiting examples of processing steps include correcting for heterogeneities near the seismic source and seismic receivers, correcting for geometrical spreading of the wavefield, attenuating noise, and attenuating seismic multiples. In particular, the generation of nulls in the seismic signal spectrum and angular variation in the radiation pattern by the processing algorithms must be avoided.

If a seismic image indicates the presence of hydrocarbons in the subsurface region of interest (102), a drilling system may drill the wellbore (118) to access those hydrocarbons.

Figure 3:
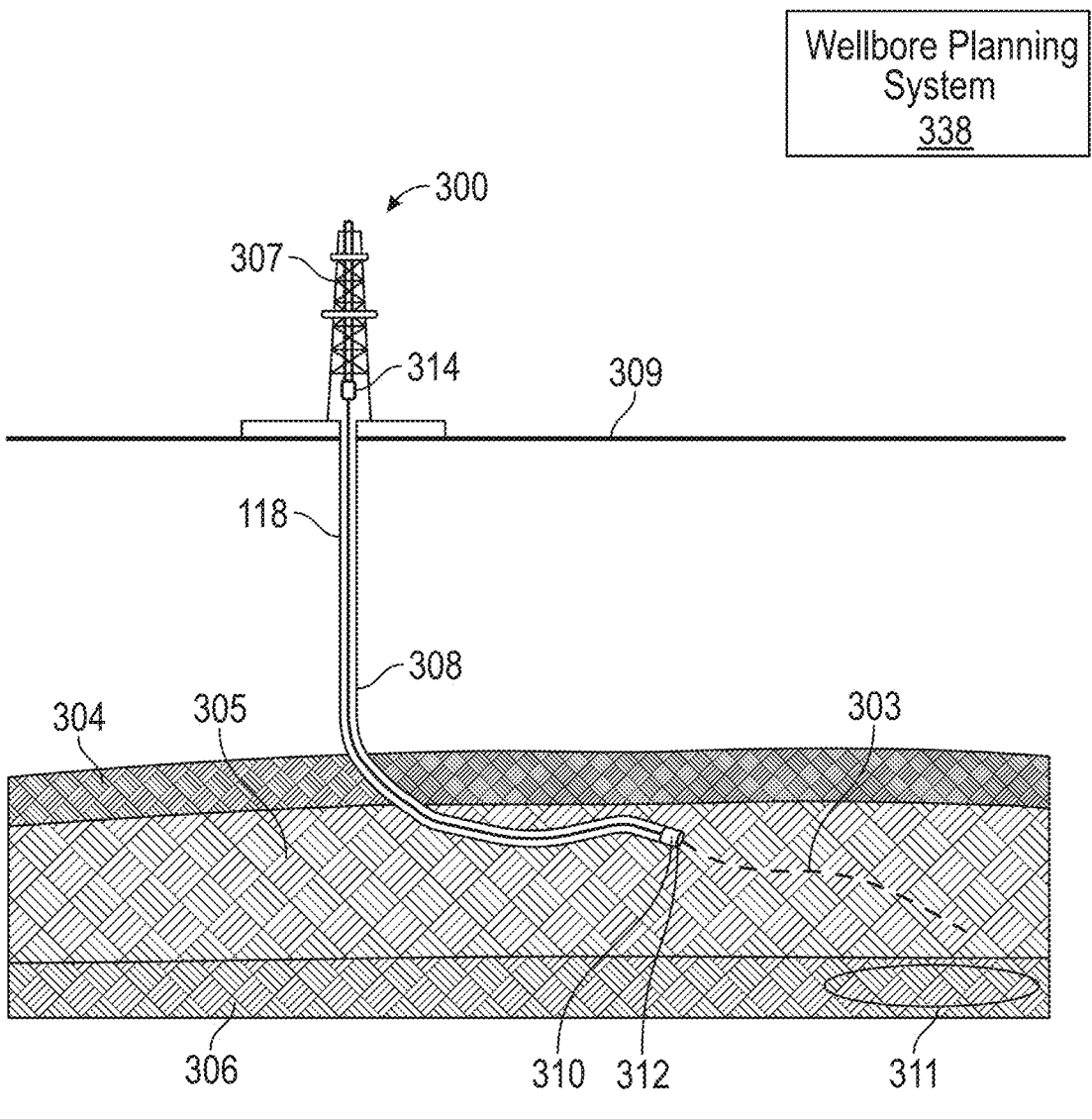
FIG. 3 shows a drilling system (300) in accordance with one or more embodiments.

FIG. 3 shows a drilling system (300) around at well site in accordance with one or more embodiments. In general, well sites may be configured in a myriad of ways. Therefore, the well site in FIG. 3 is not intended to be limiting with respect to the particular configuration of the drilling equipment. The well site is depicted as being on land. In other examples, the well site may be offshore, and drilling may be carried out with or without use of a marine riser.

The drilling system (300) may be configured to drill a wellbore (118), along a wellbore trajectory (303), into a subsurface including various formations (304, 305) to reach a hydrocarbon reservoir (306), and specifically to a drilling target (311) within the hydrocarbon reservoir (306). The wellbore trajectory (303) may be a curved or a straight trajectory. All or part of the wellbore trajectory (303) may be vertical, and some wellbore trajectory (303) may be deviated or have horizontal sections.

For the purpose of drilling a new section of the wellbore (118), the drilling system (300) may include a drillstring (308) attached to a drilling rig (307) located on the surface of the earth "surface" (309). The drillstring (308) may include one or more drill pipes connected to form conduit and a bottom hole assembly ("BHA") (310) disposed at the distal end of the conduit. The BHA (310) may include a drill bit (312) to cut into the subsurface rock. The BHA (310) may include measurement tools, such as a measurement-while-drilling (MWD) tool and logging-while-drilling (LWD) tool.

Measurement tools may include sensors and hardware to measure downhole drilling parameters, and these measurements may be transmitted to the surface (309) using any suitable telemetry system known in the art. The BHA (310) and the drillstring (308) may include other drilling tools known in the art but not specifically shown.

During a drilling operation the drillstring (308) is rotated relative to the wellbore (118), and weight is applied to the drill bit (312) to enable the drill bit (312) to break rock as the drillstring (308) is rotated. In some cases, a top drive (314) may be coupled to the top of the drillstring (308) and is operable to rotate the drillstring (308). In further embodiments, the drill bit (312) may be rotated using a combination of a drilling motor and the top drive (314).

While cutting rock with the drill bit (312), drilling fluid (commonly called "mud") may flow into the drillstring (308) through appropriate flow paths in the top drive (314). The mud flows down the drillstring (308) and exits into the bottom of the wellbore (118) through nozzles in the drill bit (312). The mud in the wellbore (118) then flows back up to the surface in an annular space between the drillstring (308) and the wellbore (118) with entrained cuttings. Typically, the cuttings are removed from the mud, and the mud is reconditioned as necessary, before pumping the mud again into the drillstring (308).

In some embodiments, the drilling system (300) may communicate with other systems in the well environment. The drilling system (300) may control at least a portion of a drilling operation by providing controls to various components of the drilling operation. In one or more embodiments, the drilling system (300) may receive data from one or more sensors arranged to measure controllable parameters of the drilling operation. As a non-limiting example, sensors may be arranged to measure weight-on-bit, drill rotational speed (RPM), flow rate of the mud pumps (GPM), and rate of penetration of the drilling operation (ROP). Each sensor may be positioned or configured to measure a desired physical stimulus.

Knowledge of the existence and location of a hydrocarbon reservoir (306) and other subterranean features may be transferred to a wellbore planning system (338) to update a wellbore plan. The wellbore plan may include a wellbore trajectory (303) from the surface (309) to penetrate the hydrocarbon reservoir (306). The wellbore plan may be generated based on best available information at the time of planning from a geophysical model, geomechanical models encapsulating subterranean stress conditions, the trajectory of any existing wellbores (which it may be desirable to avoid), and the existence of other drilling hazards, such as shallow gas pockets, over-pressure zones, and active fault planes.

In particular, knowledge of the distribution of fluid deposits with depth in the subsurface region of interest (102) may allow the planning of horizontal portions of a wellbore trajectory (303). Generation of fluid type facies in two horizontal spatial directions is a procedure known by those skilled in the art to locate fluid deposits from seismic data, but it does not provide information about the depth. When the distribution with depth of fluid deposits is a desired attribute, seismic data processing and interpretation schemes for extracting geological bodies in three-dimensions may be implemented.

Figure 4:
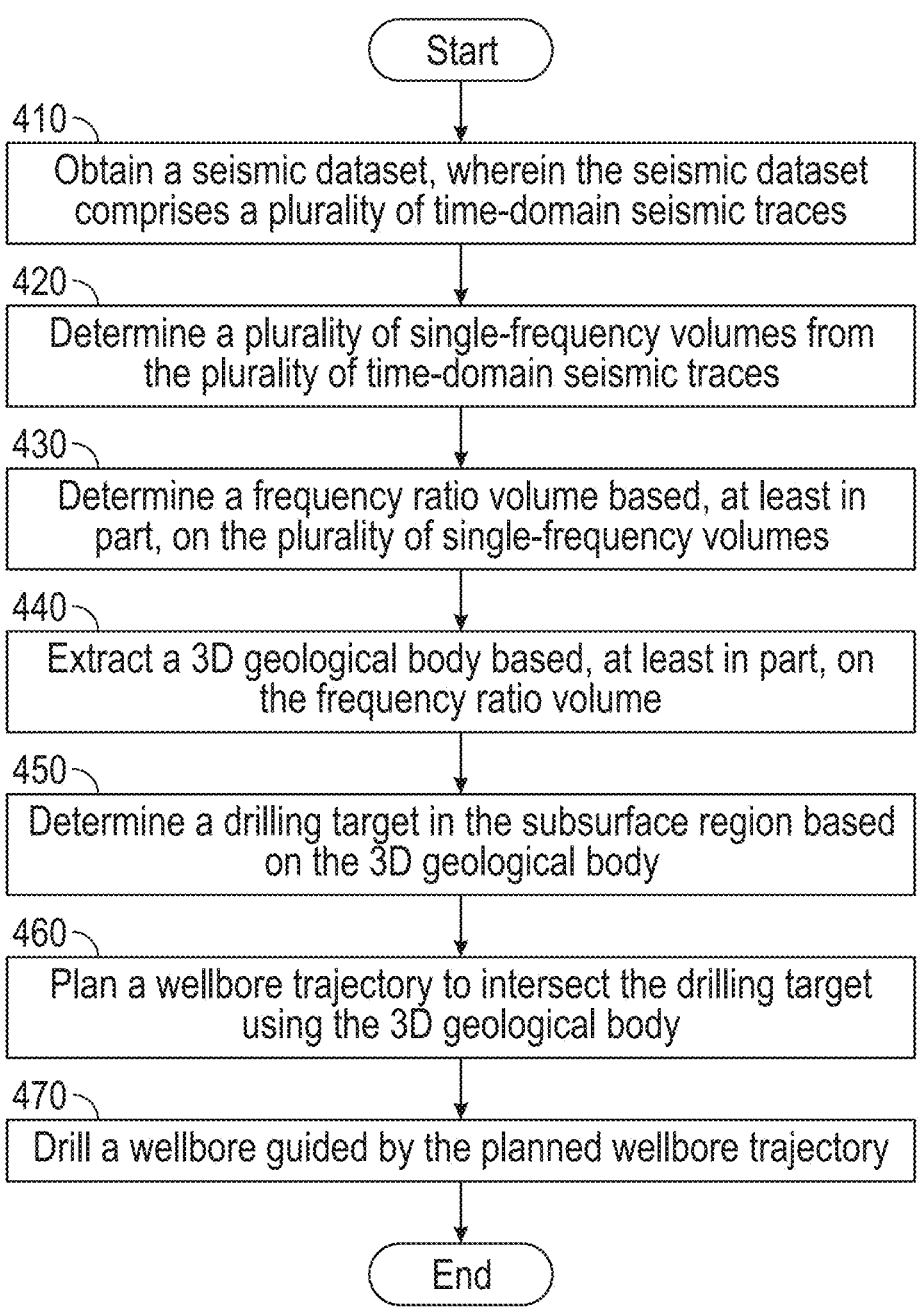
FIG. 4 shows a flowchart in accordance with one or more embodiments.

Turning to FIG. 4, FIG. 4 shows a flowchart in accordance with one or more embodiments. Specifically, FIG. 4 describes a general method for extracting a three-dimensional geobody from a seismic dataset. While the various blocks in FIG. 4 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

In Block 410, a seismic dataset regarding a subsurface region of interest is obtained in accordance with one or more embodiments. The seismic dataset may be acquired using a seismic acquisition system (100) above a subsurface region of interest (102) and may include a plurality of time-domain seismic traces (200). A seismic processor (220) may process the plurality of time-domain seismic traces (200) to attenuate noise and remove multiples. The time-domain seismic traces (200) may be organized in two orthogonal spatial dimensions (204, 206) and a recording time axis (202). In some embodiments, the plurality of time-domain seismic traces (200) comprises a Relative Amplitude Preserved 3D pre-stack time-migrated dataset.

In Block 420, a plurality of single-frequency volumes from the plurality of time-domain seismic traces is determined, in accordance with one or more embodiments. The plurality of single-frequency volumes may be determined using spectral decomposition. In some embodiments, spectral decomposition includes decomposing each of the plurality of time-domain seismic traces into a plurality of time-varying frequency-components. According to some embodiments, spectral decomposition may be performed using a short-time discrete Fourier transform, such as a Gabor transform or S-transform, the continuous wavelet transform, or the Wigner distribution. Other methods of spectrally decomposing the plurality of time-domain seismic traces (200) may be apparent to one skilled in the art.

Figure 5:
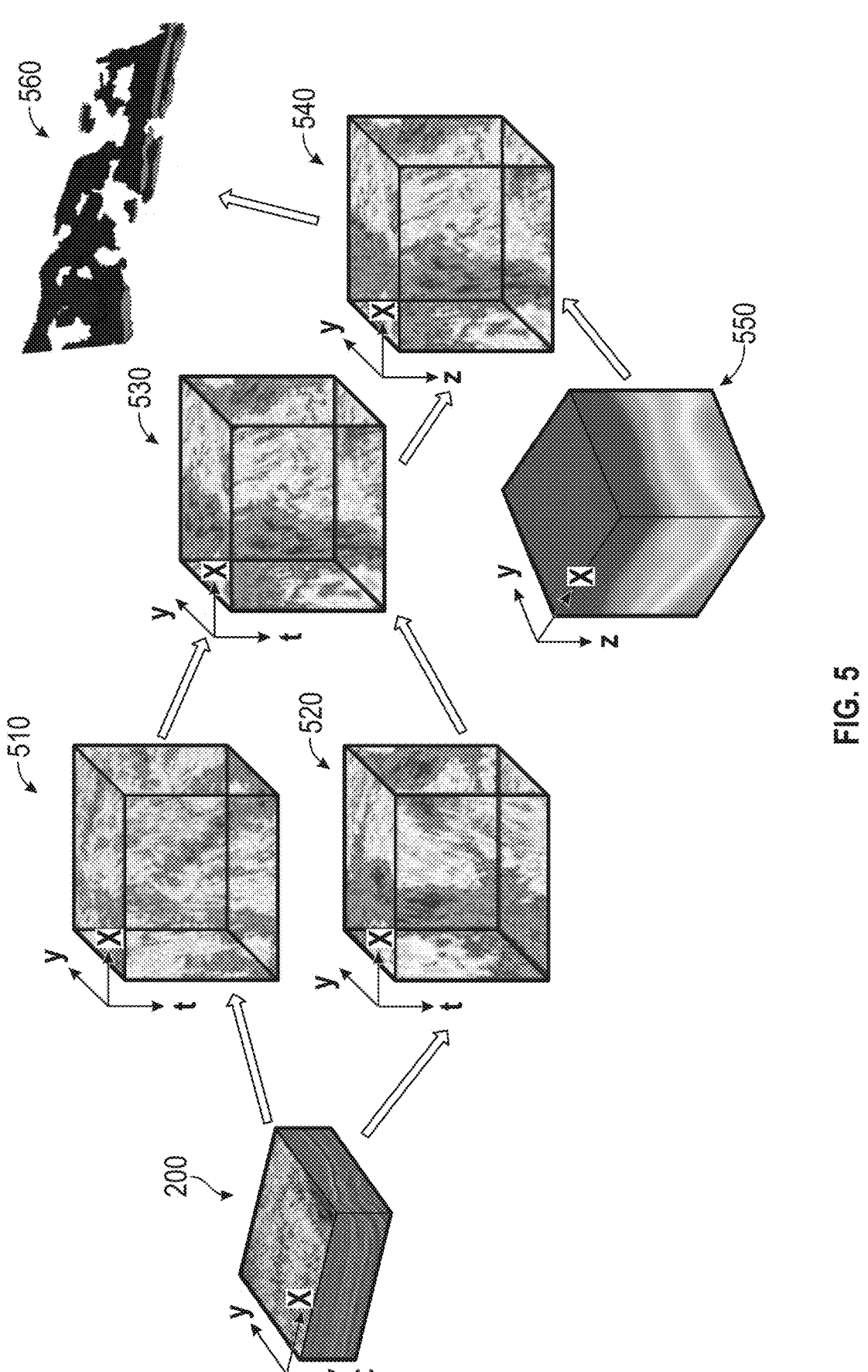
FIG. 5 illustrates a method for processing seismic data, in accordance with one or more embodiments.

FIG. 5 illustrates a method for processing seismic data, in accordance with one or more embodiments. As seen, the plurality of time-domain seismic traces (200) may be defined in the x-, y- and t-axes, and thus, it may be denoted by $S(x, y, t)$. After spectral decomposition, at each $(x, y)$ point there is a plurality of time-varying frequency-components, and thus the resulting transformed volume may be expressed as $\bar{S}(x, y, f, t)$. Since seismic energy may be concentrated in narrow frequency bands, seismic data interpretation may be performed based on certain discrete frequency components. Accordingly, a single-frequency volume $\bar{S}_i(510, 520)$ may represent the amplitude of the transformed volume $\bar{S}$ at a discrete frequency $f_i$, i.e., $\bar{S}_i(x, y, t) = \bar{S}(x, y, f_i, t)$. According to other embodiments, the single-frequency volume $\bar{S}_i$ (510, 520) may represent an average amplitude over a narrow band of frequencies. As non-limiting examples single-frequency volumes can be generated for frequencies of 5, 10, 20, 30, 40 and 50 Hz.

Single-frequency volumes may be generated to help identify locations of gas-saturated reservoirs. Based on scattering theory, it is expected that the high frequency components of seismic waves passing through a formation containing gas are strongly attenuated. The presence of gas within a reservoir may then be associated with a high-frequency volume of low amplitude if at the same locations a low-frequency volume shows higher amplitudes.

In accordance with one or more embodiments, in Block 430, a frequency ratio volume is determined based, at least in part, on the plurality of single-frequency volumes. A combination of single-frequency volumes may be used to determine a frequency ratio volume. In one or more embodiments, the frequency ratio volume may be a time-domain frequency ratio volume. In this case, two single-frequency volumes $\bar{S}_i(x, y, t) = \bar{S}(x, y, f_i, t)$ (510) and $\bar{S}_j(x, y, t) = \bar{S}(x, y, f_j, t)$ (520) may be combined to determine the time-domain frequency ratio volume $R_t=R_t(x, y, t)$ (530), as illustrated in FIG. 5. As a non-limiting example, each amplitude in the time-domain frequency ratio volume $R_t$ (530) may be calculated as the ratio of the amplitude in a first single-frequency volume $\overline{S}_i$ (510) and the amplitude in a second single-frequency volume $\overline{S}_j$ (520). The amplitude in the second single-frequency volume $\overline{S}_j$ (520) may have the same (x, y, t) coordinates as the amplitude in the first single-frequency volume $\overline{S}_i$ (510) when calculating the time-domain frequency ratio volume $R_t$ (530).

In other embodiments, the value of each amplitude in the time-domain frequency ratio volume $R_t$ (530) may be calculated from a plurality of amplitudes in the first single-frequency volume $\overline{S}_i$ (510), or a plurality of amplitudes in the second single-frequency volume $\overline{S}_j$ (520), or both. The plurality of amplitudes in the second single-frequency volume $\overline{S}_j$ (520) may occupy the same (x, y, t) coordinates as the plurality of amplitudes in the first single-frequency volume $\overline{S}_i$ (510) when calculating the time-domain frequency ratio volume $R_t$ (530). Further, other combinations that include but are not limited to the mean, mode, or maximum applied to the plurality of amplitudes in the single-frequency volumes (510, 520) could be used to calculate the amplitude in the time-domain frequency ratio volume $R_t$ (530).

Turning to FIG. 6, FIG. 6 illustrates a method to extract a 3D geological body from two single-frequency volumes, according to some embodiments. In block (600) a time-domain frequency ratio volume $R_t$ (530) is determined by dividing the first single-frequency volume $\overline{S}_i$ (510) by the second single-frequency volume $\overline{S}_j$ (520). In some embodiments, the first single-frequency volume $\overline{S}_i$ (510) is one with amplitudes higher than a predetermined value in gas reservoir locations. For instance, the predetermined value may be determined from amplitudes corresponding to regions with water content. Furthermore, the second single-frequency volume $\overline{S}_j$ (520) may be one with very low amplitudes and may correspond to a frequency $f_j$ that is higher than the frequency $f_i$. As such, the time-domain frequency ratio volume $R_t$ (530) may be used to identify gas reservoirs in the subsurface region of interest (102).

In Block 440, a three-dimensional (3D) geological body is extracted based, at least in part, on the frequency ratio volume, in accordance with one or more embodiments. A location where the time-domain frequency ratio volume $R_t$ (530) has a high amplitude may be a location where the amplitudes associated with the lower frequency $f_i$ are greater than the amplitudes associated with the higher frequency $f_j$. Because the presence of gas bearing reservoirs attenuates more strongly the higher frequencies than the lower frequencies, a location where the time-domain frequency ratio volume $R_t$ (530) has a high amplitude may be indicative of a gas bearing region. Accordingly, a 3D surface corresponding to a geological body may be identified from the time-domain frequency ratio volume $R_t$ (530) by using reservoir interpretation. For example, a 3D surface corresponding to regions where the time-domain frequency ratio volume $R_t$ (530) has high amplitudes may be designated as a gas reservoir, and a 3D geological body may be extracted.

Interpretation of the single-frequency volumes obtained from spectral decomposition may be performed in the depth domain, which may provide a precise location of a gas bearing reservoir in the 3D space. The time-domain frequency ratio volume $R_t$ (530) may be transformed into a depth-domain frequency ratio volume $R_z(x, y, z)$ (540) using a seismic velocity model $v(x, y, z)$ (550), as illustrated in FIG. 5 and in Blocks 605-640 of FIG. 6. The seismic velocity model $v(x, y, z)$ (550) provides an estimate of at least one seismic wave propagation velocity at each location in the depth domain within the subsurface region of interest (102). Typically, a seismic velocity model $v(x, y, z)$ (550) is specified by at least one seismic velocity for a particular wave type at a plurality of discrete grid points spanning the subsurface region of interest, but other specifications are possible. For example, the seismic velocity model $v(x, y, z)$ (550) may be defined by a plurality of continuously varying mathematical functions.

Furthermore, the time, $t(x, y, z)$, corresponding to any position in the seismic velocity model (550) may be calculated by:

$$t(x, y, z) = 2 \int_0^z dz'/v(x, y, z') \qquad \text{Equation (1)}$$

and the depth-domain frequency ratio volume $R_z(x, y, z)$ (540) may be determined by:

$$R_z(x, y, z) = R_t(x, y, t(x, y, z)). \qquad \text{Equation (2)}$$

In accordance with one or more embodiments, Equation (1) may be replaced by a discretized seismic velocity model (550) with a velocity value at each (x, y, z) location in 3D space.

Each value of $R_z$ (540) may be calculated from a plurality of values of $R_t$ (530) as illustrated in block (610) of FIG. 6, where a depth-domain frequency ratio is determined, according to some embodiments. First, a plurality of two-way travel time increments is determined using a depth sample interval and a velocity value, as shown in block (620). Next, in block (630) a two-way travel time of a depth sample point is determined by performing a summation of the plurality of two-way travel time increments vertically from a surface to the depth sample point. Finally, in block (640) the depth-domain frequency ratio volume $R_z$ (540) is determined by interpolating between samples in the time-domain frequency ratio volume $R_t$ (530) to the two-way travel time of the depth sample point.

In some embodiments, the plurality of time-domain seismic traces (200), the single-frequency volumes (510, 520), the time-domain frequency ratio volume $R_t$ (530), the depth-domain frequency ratio volume $R_z$ (540), and the seismic velocity model (550) may be displayed as a plurality of voxels or pixels of varying colors, hues, or saturations. In other embodiments, a grayscale representing the values of the attribute within the voxel may be used, with or without contour lines or surfaces connecting voxels with equal attribute values.

In accordance with one or mode embodiments, filters may be used in determining the plurality of time-domain seismic traces (200), the single-frequency volumes (510, 520), the time-domain frequency ratio volume $R_t$ (530), the depth-domain frequency ratio volume $R_z$ (540), and the seismic velocity model (550). The filters may be spatial filters, such as spatial-smoothing filters, dip-guided filters, structure-oriented filters, deterministic filters, and statistical filters. The purpose of such filters may include, without limitation, a reduction or removal of noise spikes, removal of outliers, the increase in spatial smoothness, or any combination of these purposes.

Keeping with FIG. 6, in Block 650, according to some embodiments, a 3D surface enclosing a 3D geological body is picked from the frequency ratio volume. High amplitude regions in a time-domain frequency ratio volume $R_t$ (530), or in a depth-domain frequency ratio volume $R_z$ (540), may be indicative of the presence of gas reservoirs. Therefore, a 3D surface corresponding to high amplitude regions of a frequency ratio volume, $R_t$ (530) or $R_z$ (540), may correspond to a geological body, and more specifically, to the location of a gas reservoir.

Figures 7, 8:
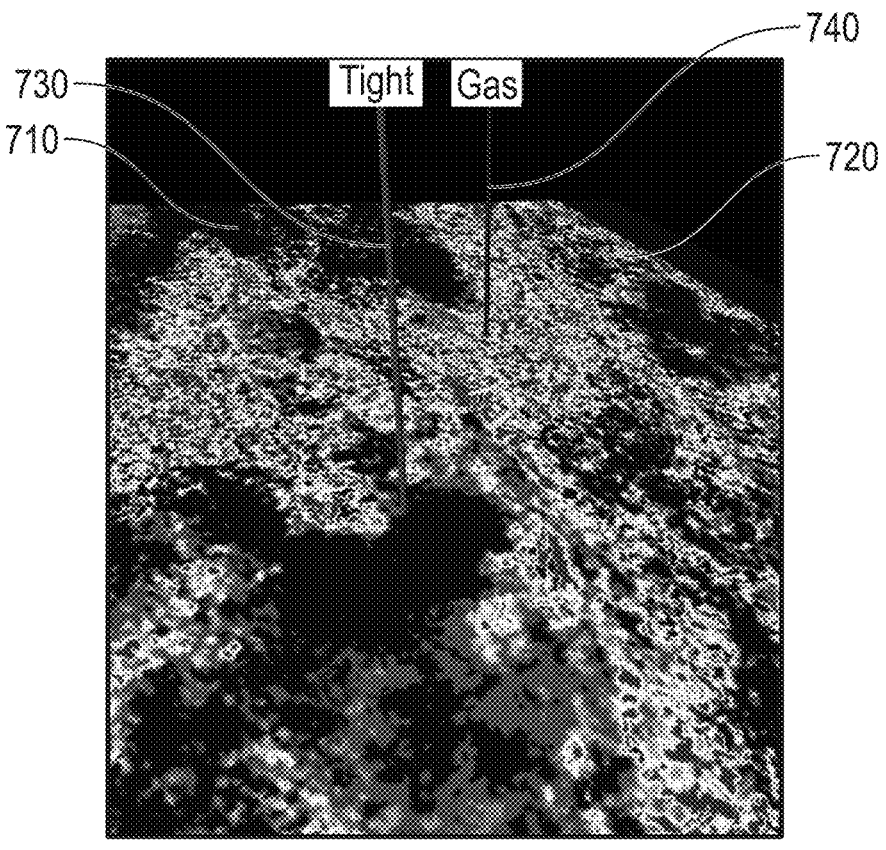
FIG. 7 illustrates shows an example of a depth-domain frequency ratio volume, in accordance with one or more embodiments.
FIG. 8 illustrates an example of an extracted three-dimensional (3D) geological body, in accordance with one or more embodiments.

Turning to FIG. 7, FIG. 7 shows an example of a depth-domain frequency ratio volume $R_z$ (540), according to some embodiments. FIG. 7 is color coded in black and white to indicate the magnitude of the depth-domain frequency ratio volume $R_z$ (540). Black, darker regions (710) indicate smaller amplitudes for $R_z$ (540), and the white, lighter regions (720) indicate greater amplitudes for $R_z$ (540). Since a greater amplitude of the depth-domain frequency ratio volume $R_z$ (540) may indicate that high frequency amplitudes are greater than the amplitudes of lower frequencies, a 3D surface enclosing the lighter regions (720) in FIG. 7 may be considered as a 3D gas geobody.

The results are confirmed by comparing the identified regions (710, 720) with the location of two existing drilled wells (730, 740). One wet (or tight) well (730) and one gas well (740), that penetrate the formations under study are displayed in FIG. 7. It is then apparent that the gas producing well (740) lies within the lighter region (720) corresponding to greater amplitudes for the depth-domain frequency ratio volume $R_z$ (540). In addition, the tight well lies in a darker region (710) corresponding to smaller amplitudes for the depth-domain frequency ratio volume $R_z$ (540).

Returning to FIG. 6, in Block 660, a 3D geological body is extracted based on a difference between an amplitude of the frequency ratio volume and a predetermined threshold value, according to one or more embodiments. The threshold value may be defined manually or automatically based on internal or external data. In a non-limiting example, the threshold value may be obtained using frequency ratio volumes of confirmed gas deposits, and frequency ratio volumes of non-gas regions (for example, a tight or wet reservoir). In other embodiments, the threshold value may be obtained from frequency ratio values of existing gas and/or tight wells penetrating the formations under study. Specifically, the predetermined threshold value may be based on the lowest value the frequency ratio volume $R_t$ (530) or $R_z$ (540) may attain at the location of the existing gas well. A 3D geological body (560) extracted from a depth-domain frequency ratio volume $R_z$ (540) is schematically shown in FIG. 5. The extracted 3D geological body (560) may be stored on a non-transitory computer memory for later retrieval and used in reservoir development planning.

In some embodiments, the 3D geological body (560), may be extracted by extracting the region where the frequency ratio volume is greater than the predetermined threshold value. FIG. 8 illustrates a 3D geological body (810), a 3D gas geobody in this case, extracted from the depth-domain frequency ratio volume $R_z$ of FIG. 7. The 3D geological body (810) was extracted using a threshold value determined based on data related to the existing tight well (820) and gas well (830) that penetrate the formations under study.

The technique to extract a 3D geological body (560) described herein shows to be effective on enhancing the spatial characterization of fluid/gas reservoirs. It may enhance the precision in localizing gas deposits based only on data acquired by a seismic acquisition system (100). Thus, it may contribute to improve the planning of the wellbore trajectory (303), especially for drilling horizontal portions of wellbore. Furthermore, the use of the technique to extract the 3D geological body (560) may optimize drilling operations by reducing the risk of drilling wellbores in regions highly saturated with water.

Returning to FIG. 4, in Block 450, a drilling target in the subsurface region is determined based on the 3D geological body, in accordance with one or more embodiments. A drilling target (311) in a wellbore (118) may be based upon the expected presence of gas or another hydrocarbon. Locations of a 3D geological body may indicate an elevated probability of the presence of a hydrocarbon and may be targeted by well designers. Locations of 3D geological bodies indicating a low probability of the presence of a hydrocarbon may be avoided by well designers.

In Block 460, a wellbore trajectory to intersect the drilling target in the subsurface region is planned using the 3D geological body, in accordance with one or more embodiments. Knowledge of the location of the drilling target (311), the extracted 3D geological body (560), and other formations (304, 305) may be transferred to a wellbore planning system (338). The wellbore planning system (338) may be located in the memory (909) within the computer system (900) described in FIG. 9 below. The wellbore planning system (338) uses the knowledge of the location of the drilling target (311), the extracted 3D geological body (560), and other formations (304, 305) to plan a wellbore trajectory (303) within the subterranean region of interest. The planned wellbore trajectory (303) may be influenced by shallow drilling hazards, such as gas pockets, subterranean water flows, and/or unstable/metastable fault zones.

In Block 470, a wellbore is drilled guided by the planned wellbore trajectory, in accordance with one or more embodiments. The wellbore planning system (338) may transfer the planned wellbore trajectory (303) to the drilling system (300) described in FIG. 3. The drilling system (300) may drill the wellbore (118) along the planned wellbore trajectory (303) to access and produce the hydrocarbon reservoir (306) to the surface (309).

Figure 9:
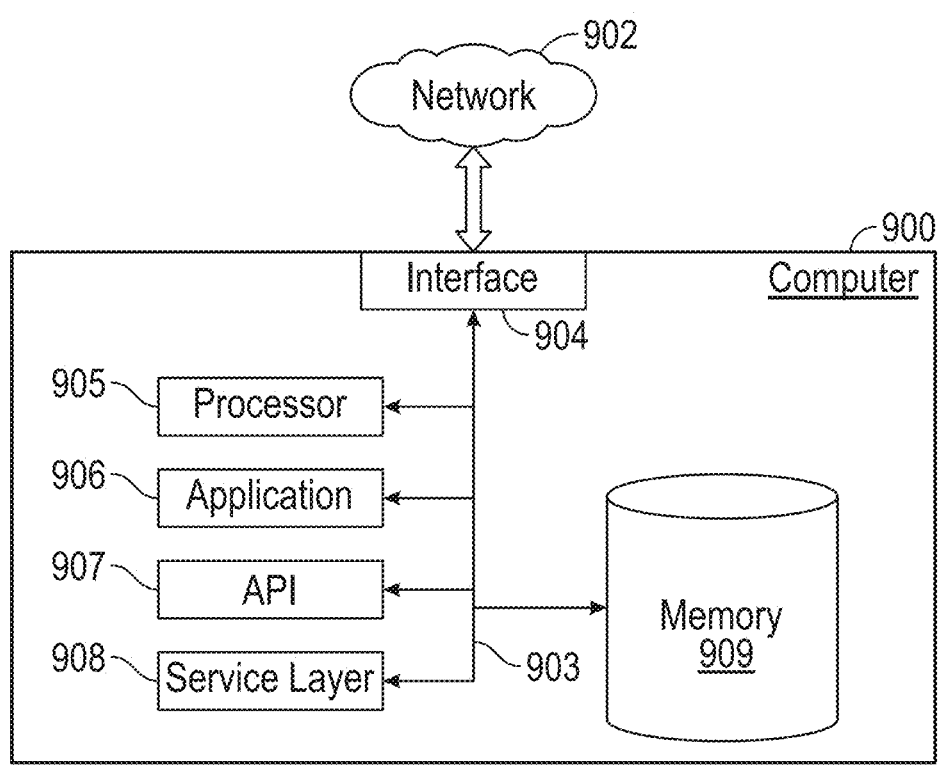
FIG. 9 illustrates a block diagram of a computer system in accordance with one or more embodiments.

In some embodiments the wellbore planning system (338) may include a computer system. FIG. 9 is a block diagram of a computer system (900) used to provide computational functionalities associated with described algorithms, methods, functions, processes, flows, and procedures as described in the instant disclosure, according to an implementation. The illustrated computer (900) is intended to encompass any computing device such as a high performance computing (HPC) device, a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer (900) may include a computer that includes an input device, such as a keypad, keyboard, touch screen, or other device that can accept user information, and an output device that conveys information associated with the operation of the computer (900), including digital data, visual, or audio information (or a combination of information), or a GUI.

The computer (900) can serve in a role as a client, network component, a server, a database or other persistency, or any other component (or a combination of roles) of a computer system for performing the subject matter described in the instant disclosure. The illustrated computer (900) is communicably coupled with a network (902). In some implementations, one or more components of the computer (900) may be configured to operate within environments, including cloud-computing-based, local, global, or other environment (or a combination of environments).

At a high level, the computer (900) is an electronic computing device operable to receive, transmit, process, store, or manage data and information associated with the described subject matter. According to some implementations, the computer (900) may also include or be communicably coupled with an application server, e-mail server, web server, caching server, streaming data server, business intelligence (BI) server, or other server (or a combination of servers).

The computer (900) can receive requests over network (902) from a client application (for example, executing on another computer (900)) and responding to the received requests by processing the said requests in an appropriate software application. In addition, requests may also be sent to the computer (900) from internal users (for example, from a command console or by other appropriate access method), external or third-parties, other automated applications, as well as any other appropriate entities, individuals, systems, or computers.

Each of the components of the computer (900) can communicate using a system bus (903). In some implementations, any or all of the components of the computer (900), both hardware or software (or a combination of hardware and software), may interface with each other or the interface (904) (or a combination of both) over the system bus (903) using an application programming interface (API) (907) or a service layer (908) (or a combination of the API (907) and service layer (908). The API (907) may include specifications for routines, data structures, and object classes. The API (907) may be either computer-language independent or dependent and refer to a complete interface, a single function, or even a set of APIs. The service layer (908) provides software services to the computer (900) or other components (whether or not illustrated) that are communicably coupled to the computer (900). The functionality of the computer (900) may be accessible for all service consumers using this service layer (908). Software services, such as those provided by the service layer (908), provide reusable, defined business functionalities through a defined interface. For example, the interface may be software written in JAVA, C++, or other suitable language providing data in extensible markup language (XML) format or other suitable format. While illustrated as an integrated component of the computer (900), alternative implementations may illustrate the API (907) or the service layer (908) as stand-alone components in relation to other components of the computer (900) or other components (whether or not illustrated) that are communicably coupled to the computer (900). Moreover, any or all parts of the API (907) or the service layer (908) may be implemented as child or sub-modules of another software module, enterprise application, or hardware module without departing from the scope of this disclosure.

The computer (900) includes an interface (904). Although illustrated as a single interface (904) in FIG. 9, two or more interfaces (904) may be used according to particular needs, desires, or particular implementations of the computer (900). The interface (904) is used by the computer (900) for communicating with other systems in a distributed environment that are connected to the network (902). Generally, the interface (904) includes logic encoded in software or hardware (or a combination of software and hardware) and operable to communicate with the network (902). More specifically, the interface (904) may include software supporting one or more communication protocols associated with communications such that the network (902) or interface's hardware is operable to communicate physical signals within and outside of the illustrated computer (900).

The computer (900) includes at least one computer processor (905). Although illustrated as a single computer processor (905) in FIG. 9, two or more processors may be used according to particular needs, desires, or particular implementations of the computer (900). Generally, the computer processor (905) executes instructions and manipulates data to perform the operations of the computer (900) and any algorithms, methods, functions, processes, flows, and procedures as described in the instant disclosure.

The computer (900) also includes a memory (909) that holds data for the computer (900) or other components (or a combination of both) that may be connected to the network (902). For example, memory (909) may be a database storing data consistent with this disclosure. Although illustrated as a single memory (909) in FIG. 9, two or more memories may be used according to particular needs, desires, or particular implementations of the computer (900) and the described functionality. While memory (909) is illustrated as an integral component of the computer (900), in alternative implementations, memory (909) may be external to the computer (900).

The application (906) is an algorithmic software engine providing functionality according to particular needs, desires, or particular implementations of the computer (900), particularly with respect to functionality described in this disclosure. For example, application (906) can serve as one or more components, modules, applications, etc. Further, although illustrated as a single application (906), the application (906) may be implemented as multiple applications (906) on the computer (900). In addition, although illustrated as integral to the computer (900), in alternative implementations, the application (906) may be external to the computer (900).

There may be any number of computers (900) associated with, or external to, a computer system containing computer (900), each computer (900) communicating over network (902). Further, the term "client," "user," and other appropriate terminology may be used interchangeably as appropriate without departing from the scope of this disclosure. Moreover, this disclosure contemplates that many users may use one computer (900), or that one user may use multiple computers (900).

In some embodiments, the computer (900) is implemented as part of a cloud computing system. For example, a cloud computing system may include one or more remote servers along with various other cloud components, such as cloud storage units and edge servers. In particular, a cloud computing system may perform one or more computing operations without direct active management by a user device or local computer system. As such, a cloud computing system may have different functions distributed over multiple locations from a central server, which may be performed using one or more Internet connections. More specifically, cloud computing system may operate according to one or more service models, such as infrastructure as a service (IaaS), platform as a service (PaaS), software as a service (SaaS), mobile "backend" as a service (MBaaS), serverless computing, artificial intelligence (AI) as a service (AIaaS), and/or function as a service (FaaS).

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed:

1. A method, comprising:

obtaining a seismic dataset regarding a subsurface region of interest, wherein the seismic dataset comprises a plurality of time-domain seismic traces, and wherein an existing wellbore penetrates the subsurface region of interest;

obtaining a distribution of fluid deposits along a measured depth of the existing wellbore;

determining, using a seismic processor, a plurality of single-frequency volumes from the plurality of time-domain seismic traces;

determining, using the seismic processor, a frequency ratio volume based, at least in part, on the plurality of single-frequency volumes;

determining, using the seismic processor, a threshold value for the frequency ratio volume corresponding to a presence of gas based on the distribution of fluid deposits;

extracting, using the seismic processor, a three-dimensional (3D) geological body by extracting a region of the frequency volume ratio having a value greater than the threshold value;

determining, using the seismic processor, a drilling target in the subsurface region based on the 3D geological body:

planning, using a wellbore planning system, a wellbore trajectory to intersect the drilling target in the subsurface region using the 3D geological body; and drilling, using a drilling system, another wellbore guided by the planned wellbore trajectory.

2. The method of claim 1, wherein the frequency ratio volume comprises a time-domain frequency ratio volume based, at least in part, on dividing a first single-frequency volume by a second single-frequency volume.

3. The method of claim 1, wherein extracting the 3D geological body comprises picking a 3D surface enclosing the 3D geological body from the frequency ratio volume.

4. The method of claim 2, wherein the frequency ratio volume comprises a depth-domain frequency ratio volume and is determined from the time-domain frequency ratio volume using a seismic velocity model.

5. The method of claim 1, wherein determining each of the plurality of single-frequency volumes comprises decomposing each of the plurality of time-domain seismic traces into a plurality of time-varying frequency-components.

6. The method of claim 1, wherein the seismic dataset comprises a Relative Amplitude Preserved 3D pre-stack time-migrated dataset.

7. The method of claim 4, wherein determining the depth-domain frequency ratio volume from the time-domain frequency ratio volume comprises:

determining a plurality of two-way travel time increments each based, at least in part, on a depth sample interval and a velocity value;

determining a two-way travel time of a depth sample point based, at least in part, on a summation of the plurality of two-way travel time increments vertically from a surface to the depth sample point; and determining the depth-domain frequency ratio volume based, at least in part, on interpolating between samples in the time-domain frequency ratio volume to the two-way travel time of the depth sample point.

8. A non-transitory computer-readable medium comprising computer-executable instructions stored thereon that, when executed on a processor, cause the processor to perform:

obtaining a seismic dataset regarding a subsurface region of interest, wherein the seismic dataset comprises a plurality of time-domain seismic traces, and wherein an existing wellbore penetrates the subsurface region of interest;

obtaining a distribution of fluid deposits along a measured depth of the existing wellbore;

determining a plurality of single-frequency volumes from the plurality of time-domain seismic traces;

determining a frequency ratio volume based, at least in part, on the plurality of single-frequency volumes;

determining a threshold value for the frequency ratio volume corresponding to a presence of gas based on the distribution of fluid deposits;

extracting a three-dimensional (3D) geological body by extracting a region of the frequency volume ratio having a value greater than the threshold value;

determining a drilling target in the subsurface region based on the 3D geological body;

planning a wellbore trajectory to intersect the drilling target in the subsurface region using the 3D geological body; and cause a drilling system to drill another wellbore guided by the planned wellbore trajectory.

9. The non-transitory computer-readable medium of claim 8, further comprising computer-executable instructions that cause the processor to perform:

determining the frequency ratio volume comprising a time-domain frequency ratio volume based, at least in part, on dividing a first single-frequency volume by a second single-frequency volume.

10. The non-transitory computer-readable medium of claim 8, further comprising computer-executable instructions that cause the processor to perform:

determining the frequency ratio volume comprising a depth-domain frequency ratio volume from the time-domain frequency ratio volume using a seismic velocity model.

11. The non-transitory computer-readable medium of claim 8, further comprising computer-executable instructions that cause the processor to perform:

extracting the 3D geological body by picking a 3D surface enclosing the 3D geological body from the frequency ratio volume.

12. The non-transitory computer-readable medium of claim 8, further comprising computer-executable instructions that cause the processor to perform:

decomposing each of the plurality of time-domain seismic traces into a plurality of time-varying frequency-components.

13. The non-transitory computer-readable medium of claim 10, further comprising computer-executable instructions that cause the processor to perform:

determining a plurality of two-way travel time increments each based, at least in part, on a depth sample interval and a velocity value;

determining a two-way travel time of a depth sample point based, at least in part, on a summation of the plurality of two-way travel time increments vertically from a surface to the depth sample point; and determining the depth-domain frequency ratio volume based, at least in part, on interpolating between samples in the time-domain frequency ratio volume to the two-way travel time of the depth sample point.

14. A system, comprising:

a seismic acquisition system configured to record a seismic dataset regarding a subsurface region of interest, wherein the seismic dataset comprises a plurality of time-domain seismic traces, and wherein an existing wellbore penetrates the subsurface region of interest;

a seismic processor, configured to:

obtain the plurality of time-domain seismic traces;

obtain a distribution of fluid deposits along a measured depth of the existing wellbore;

determine a plurality of single-frequency volumes from the plurality of time-domain seismic traces;

determine a frequency ratio volume based, at least in part, on the plurality of single-frequency volumes;

determine a threshold value for the frequency ratio volume corresponding to a presence of gas based on the distribution of fluid deposits;

extract a three-dimensional (3D) geological body by extracting a region of the frequency volume ratio having a value greater than the threshold value; and

determine a drilling target in the subsurface region based on the 3D geological body a wellbore planning system configured to plan a wellbore trajectory to intersect the drilling target in the subsurface region using the 3D geological body; and a drilling system configured to drill another wellbore guided by the planned wellbore trajectory.

15. The system of claim 14, wherein the seismic processor is further configured to determine the frequency ratio volume comprising a time-domain frequency ratio volume based, at least in part, on dividing a first single-frequency volume by a second single-frequency volume.

16. The system of claim 15, wherein the seismic processor is further configured to determine the frequency ratio volume comprising a depth-domain frequency ratio volume from the time-domain frequency ratio volume using a seismic velocity model.

* * * * *